United States Patent
Ajisaka (10) Patent No.: US 8,689,925 B2
(45) Date of Patent: Apr. 8, 2014

(54) VEHICLE FRONT PORTION STRUCTURE

(75) Inventor: Satoshi Ajisaka, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/820,670

(22) PCT Filed: Mar. 1, 2012

(86) PCT No.: PCT/JP2012/055274
§ 371 (c)(1),
(2), (4) Date: Mar. 4, 2013

(87) PCT Pub. No.: WO2013/128618
PCT Pub. Date: Sep. 6, 2013

(65) Prior Publication Data
US 2013/0240284 A1    Sep. 19, 2013

(51) Int. Cl.
*F01N 3/20*   (2006.01)

(52) U.S. Cl.
USPC .......................... 180/309; 180/68.2; 180/68.3

(58) Field of Classification Search
USPC ............. 180/309, 68.1, 68.2, 68.3, 68.4, 185, 180/89.2; 165/41; 123/198 E; 60/284, 323
See application file for complete search history.

(56) References Cited

U.S. PATENT DOCUMENTS

| | | | |
|---|---|---|---|
| 1,659,866 A * | 2/1928 | Fornaca ........................ | 105/62.1 |
| 4,086,976 A * | 5/1978 | Holm et al. .................... | 180/68.1 |
| 4,265,332 A * | 5/1981 | Presnall et al. ................ | 181/211 |
| 4,610,326 A * | 9/1986 | Kirchweger et al. ......... | 180/68.1 |
| 4,690,204 A * | 9/1987 | Reichel et al. ................... | 165/44 |
| 4,805,747 A * | 2/1989 | Moedinger et al. ........ | 188/264 A |
| 5,050,701 A * | 9/1991 | Okui et al. ..................... | 180/297 |
| 5,551,505 A * | 9/1996 | Freeland .......................... | 165/41 |
| 5,956,946 A * | 9/1999 | Yamada .......................... | 60/296 |
| 6,182,447 B1 * | 2/2001 | Hashimura et al. ............. | 60/323 |
| 6,260,652 B1 * | 7/2001 | Steenackers et al. ......... | 180/296 |
| 6,321,530 B1 * | 11/2001 | Hoshi et al. .................... | 60/274 |
| 6,427,798 B1 * | 8/2002 | Imashige ....................... | 180/309 |
| 6,502,659 B2 * | 1/2003 | Akasaka ....................... | 180/309 |
| 6,708,484 B2 * | 3/2004 | Onodera et al. ................ | 60/286 |
| 7,931,119 B2 * | 4/2011 | Fujita ............................. | 181/228 |
| 8,166,759 B2 * | 5/2012 | Yaguchi et al. ................. | 60/618 |
| 8,544,583 B2 * | 10/2013 | Ajisaka ........................ | 180/68.1 |
| 2002/0092295 A1 * | 7/2002 | Suzuki et al. ................... | 60/284 |
| 2005/0051372 A1 * | 3/2005 | Guertler ........................ | 180/68.1 |
| 2007/0113539 A1 * | 5/2007 | Nakano ........................... | 60/276 |
| 2009/0013686 A1 * | 1/2009 | Yaguchi et al. ................. | 60/597 |

(Continued)

FOREIGN PATENT DOCUMENTS

| JP | 2008-208716 A | 9/2008 |
|---|---|---|
| JP | 2010-007570 A | 1/2010 |
| WO | 2010/097890 A1 | 9/2010 |

*Primary Examiner* — Katy M Ebner
*Assistant Examiner* — Brodie Follman
(74) *Attorney, Agent, or Firm* — Kenyon & Kenyon LLP (57) ABSTRACT

A cooling unit that is cooled by heat exchange with air is disposed at a rear side in a vehicle longitudinal direction of a power unit. Further, a cooling fan is disposed at a rear in the vehicle longitudinal direction of the cooling unit. Further, catalytic converters are disposed at a rear side in the vehicle longitudinal direction of the power unit. A periphery of these catalytic converters is surrounded by a heat insulator. A duct portion, that communicates an interior of the heat insulator and a space between the cooling unit and the cooling fan, is provided at this heat insulator.

10 Claims, 8 Drawing Sheets

(56) References Cited

U.S. PATENT DOCUMENTS

| | | | |
|---|---|---|---|
| 2011/0139525 A1* | 6/2011 | Karl | 180/68.1 |
| 2011/0284298 A1* | 11/2011 | Ajisaka | 180/65.21 |
| 2012/0024611 A1* | 2/2012 | Ajisaka | 180/68.1 |
| 2012/0292121 A1* | 11/2012 | Murray | 180/68.1 |
| 2013/0026244 A1* | 1/2013 | Chernyavsky et al. | 237/12 |
| 2013/0133963 A1* | 5/2013 | Ajisaka | 180/68.1 |
| 2013/0146378 A1* | 6/2013 | Shigematsu et al. | 180/68.3 |
| 2013/0240284 A1* | 9/2013 | Ajisaka | 180/309 |

* cited by examiner

VEHICLE FRONT PORTION STRUCTURE

This is a 371 national phase application of PCT/JP2012/055274 filed 1 Mar. 2012, the contents of which are incorporated herein by reference.

TECHNICAL FIELD

The present invention relates to a vehicle front portion structure.

BACKGROUND ART

There is known a vehicle front portion structure that has a power unit provided at a vehicle front portion, and a cooling unit disposed at the rear side in the vehicle longitudinal direction with respect to the power unit (e.g., International Publication No. 2010/097890). In this vehicle front portion structure, a catalytic converter, for purifying the exhaust gas of an engine that structures the power unit, is disposed within a floor tunnel.

Further, there is known a cooling system that circulates coolant between an exhaust heat recovery device and a heater core while bypassing the engine (e.g., Japanese Patent Application Laid-Open No. 2008-208716, Japanese Patent Application Laid-Open No. 2010-007570).

SUMMARY OF INVENTION

Technical Problem

By the way, in order to cause the catalyst within the catalytic converter to exhibit the ability to purify the exhaust gas, the catalyst must be heated to a predetermined temperature (hereinafter called the "activation temperature") or higher. However, in the aforementioned vehicle front portion structures, the catalytic converter is apart from the engine. Therefore, immediately after start-up of the engine at which the temperature of the exhaust gas is low, or the like, there is the possibility that it may take time until the catalyst is heated to the activation temperature or higher by the heat of the exhaust gas.

On the other hand, if the temperature of the catalyst rises too much, the catalyst thermally deteriorates, and there is the possibility that the purifying ability will deteriorate.

In consideration of the above-described circumstances, an object of the present invention is to obtain a vehicle front portion structure that, while suppressing thermal deterioration of a catalyst, can heat the catalyst to the activation temperature or higher at an early stage.

Solution to Problem

A vehicle front portion structure relating to a first aspect of the present invention comprises: a power unit that is disposed in a power unit compartment provided at a vehicle front portion, and that includes an internal combustion engine that generates driving force that causes a vehicle to travel; a cooling unit that is disposed at a rear side in a vehicle longitudinal direction with respect to the power unit, and that is cooled by heat exchange with air; a fan that is disposed at a rear in the vehicle longitudinal direction of the cooling unit, and that, by being operated, generates cooling wind that passes through the cooling unit and is discharged to a vehicle exterior; an exhaust purifying device that is disposed at a rear side in the vehicle longitudinal direction with respect to the power unit, and that has a catalyst that purifies exhaust gas discharged from the internal combustion engine; a heat retaining member that surrounds a periphery of the exhaust purifying device, and in which is formed an air intake port that takes-in, into an interior, air that cools the exhaust purifying device; and a communication portion that communicates the interior of the heat retaining member and a space between the cooling unit and the fan.

In accordance with the above-described aspect, due to the periphery of the exhaust purifying device being surrounded by the heat retaining member, the catalyst of the exhaust purifying device can be heated at an early stage to the activation temperature or higher by the heat of the exhaust gas discharged from the internal combustion engine, as compared with a case in which the periphery of the exhaust purifying device is not surrounded by the heat retaining member. Accordingly, for example, immediately after start-up of the internal combustion engine at which the temperature of the exhaust gas is low, or the like, the catalyst can be made to exhibit an exhaust gas purifying ability at an early stage.

On the other hand, the air intake port is formed in the heat retaining member. Further, the interior of the heat retaining member, and the space between the cooling unit and the fan, are communicated by the communication portion. Therefore, when the fan is operated, cooling wind, that passes through the cooling unit and is discharged to the exterior of the vehicle, is generated, and negative pressure is generated at the communication portion. Due to this negative pressure, air at the interior of the heat retaining member is discharged to the exterior of the vehicle via the communication portion, and air is taken-into the interior of the heat retaining member from the air intake port. Namely, when the fan is operated, the interior of the heat retaining member is ventilated, and the exhaust purifying device that is disposed at the interior of the heat retaining member is cooled. Accordingly, by causing the fan to operate, thermal deterioration of the catalyst can be suppressed.

In this way, in accordance with the present aspect, the catalyst of the exhaust purifying device can be heated to the activation temperature or higher at an early stage, while thermal deterioration of the catalyst is suppressed.

In a vehicle front portion structure relating to a second aspect of the present invention, in the vehicle front portion structure relating to the above-described first aspect, the exhaust purifying device is disposed at a front side in the vehicle longitudinal direction with respect to a dash panel that divides the power unit compartment and a vehicle cabin.

In accordance with the above-described aspect, by disposing the exhaust purifying device at the front side in the vehicle longitudinal direction with respect to the dash panel, the distance between the internal combustion engine and the exhaust purifying device is short and heat loss of the exhaust gas is reduced, as compared with a case in which the exhaust purifying device is disposed at the rear side in the vehicle longitudinal direction with respect to the dash panel. Accordingly, the catalyst of the exhaust purifying device can be heated to the activation temperature or higher at an early stage.

In a vehicle front portion structure relating to a third aspect of the present invention, in the vehicle front portion structure relating to the above-described second aspect, the exhaust purifying device is disposed with a longitudinal direction thereof being a vehicle transverse direction.

In accordance with the above-described aspect, by disposing the exhaust purifying device with the longitudinal direction thereof being the vehicle transverse direction, the exhaust purifying device can be set near to the internal combustion engine, that is a heat source, along the entire length in the longitudinal direction of the exhaust purifying device, as compared with a case in which the exhaust purifying device is disposed with the longitudinal direction thereof being the vehicle longitudinal direction. Accordingly, the catalyst of the exhaust purifying device can be heated to the activation temperature or higher at an even earlier stage.

In a vehicle front portion structure relating to a fourth aspect of the present invention, the vehicle front portion structure relating to the above-described second aspect or the above-described third aspect comprises: a temperature detecting portion that detects a temperature of the catalyst; and a control section that causes the fan to operate when the temperature of the catalyst detected by the temperature detecting portion is greater than or equal to a predetermined value.

In accordance with the above-described aspect, the control section causes the fan to operate when the temperature of the catalyst detected by the temperature detecting portion is greater than or equal to a predetermined value. When the fan is operated, as described above, negative pressure is generated at the communication portion, and air at the interior of the heat retaining member is discharged to the exterior of the vehicle via the communication portion, and air is taken-into the interior of the heat retaining member from the air intake port. Namely, when the fan is operated, the interior of the heat retaining member is ventilated, and the exhaust purifying device that is disposed at the interior of the heat retaining member is cooled. Accordingly, thermal deterioration of the catalyst is suppressed.

In a vehicle front portion structure relating to a fifth aspect of the present invention, the vehicle front portion structure relating to any one of the above-described second aspect through fourth aspect comprises: a shroud that covers the space between the cooling unit and the fan, and in which a connection port, into which the communication portion is inserted, is formed, wherein the communication portion is provided at the heat retaining member, and the heat retaining member is supported at the exhaust purifying device or a pipe that is connected to the exhaust purifying device, so as to be able to be displaced relative to the shroud.

In accordance with the above-described aspect, the heat retaining member is supported at the exhaust purifying device so as to be able to be displaced relative to the shroud. Accordingly, even if the heat retaining member vibrates integrally with the exhaust purifying device due to, for example, vibrations that propagate from the internal combustion engine or vibrations that accompany traveling of the vehicle, damage to the connection port of the shroud and the communication portion is suppressed.

In a vehicle front portion structure relating to a sixth aspect of the present invention, the vehicle front portion structure relating to any one of the above-described second aspect through fourth aspect comprises: a shroud that covers the space between the cooling unit and the fan, and in which a connection port, into which the communication portion is inserted, is formed, wherein the communication portion is provided at the heat retaining member, and the heat retaining member is supported at the shroud, so as to be able to be displaced relative to the exhaust purifying device.

In accordance with the above-described aspect, the heat retaining member is supported at the shroud so as to be able to be displaced relative to the exhaust purifying device. Accordingly, even if the heat retaining member vibrates integrally with the exhaust purifying device due to, for example, vibrations that propagate from the internal combustion engine or vibrations that accompany traveling of the vehicle, damage to the connection port of the shroud and the communication portion is suppressed.

In a vehicle front portion structure relating to a seventh aspect of the present invention, in the vehicle front portion structure relating to any one of the above-described second aspect through sixth aspect, the cooling unit is structured to include a radiator core that exchanges heat between air and coolant, that circulates between the radiator core and the internal combustion engine, and cools the coolant.

In accordance with the above-described aspect, the cooling unit is structured to include the radiator core. By ventilating the air at the interior of the heat retaining member by using the fan that cools this radiator core, thermal deterioration of the catalyst of the exhaust purifying device can be suppressed while the number of parts is reduced.

Further, by disposing the radiator core at the rear side in the vehicle longitudinal direction with respect to the power unit, the power unit can be moved toward the front side in the vehicle longitudinal direction, as compared with a case in which the radiator core is disposed at the front side in the vehicle longitudinal direction with respect to the power unit. Due thereto, it is easy to ensure space for setting the exhaust purifying device at the front side in the vehicle longitudinal direction with respect to the dash panel.

In a vehicle front portion structure relating to an eighth aspect of the present invention, the vehicle front portion structure relating to the above-described seventh aspect comprises: a heater core that exchanges heat between the coolant and air for air conditioning, and heats the air for air conditioning; and an exhaust heat recovery device that exchanges heat between the coolant, that bypasses the internal combustion engine and the radiator core and circulates between the exhaust heat recovery device and the heater core, and exhaust gas, that is discharged from the exhaust purifying device, and heats the coolant.

In accordance with the above-described aspect, the coolant is heated by heat being exchanged, by the exhaust heat recovery device, between the coolant and the exhaust gas that is discharged from the exhaust purifying device. Air for air conditioning is heated by this coolant, that has been heated, exchanging heat with the air for air conditioning at the heater core.

Accordingly, for example, immediately after start-up of the internal combustion engine at which the temperature of the coolant is low, or the like, the temperature of the coolant can be raised at an early stage by causing the coolant to bypass the internal combustion engine and the radiator core and circulate between the exhaust recovery device and the heater core. As a result, the temperature of the air for air conditioning can be raised at an early stage.

Further, as described above, the exhaust purifying device is surrounded by the heat retaining member. Due thereto, exhaust gas of a high temperature is supplied from the exhaust purifying device to the exhaust heat recovery device, as compared with a case in which the exhaust purifying device is not surrounded by the heat retaining member. Accordingly, at the exhaust heat recovery device, the temperature of the coolant can be raised at an early stage.

In a vehicle front portion structure relating to a ninth aspect of the present invention, in the vehicle front portion structure relating to the above-described eighth aspect, the exhaust heat recovery device is disposed at a front side in the vehicle longitudinal direction with respect to the dash panel.

In accordance with the above-described aspect, by disposing the exhaust heat recovery device at the front side in the vehicle longitudinal direction with respect to the dash panel, the distance between the internal combustion engine and the exhaust heat recovery device is short and heat loss of the exhaust gas is reduced, as compared with a case in which the exhaust heat recovery device is disposed at the rear side in the vehicle longitudinal direction with respect to the dash panel. Accordingly, exhaust gas of an even higher temperature is supplied from the exhaust purifying device to the exhaust heat recovery device. As a result, at the exhaust heat recovery device, the temperature of the coolant can be raised at an even earlier stage.

In a vehicle front portion structure relating to a tenth aspect of the present invention, in the vehicle front portion structure relating to the above-described eighth aspect or ninth aspect, the cooling unit is structured to include a tank that stores the coolant, and the vehicle front portion structure comprises a bypass circulation path that circulates the coolant between the tank, the exhaust heat recovery device, and the heater core.

In accordance with the above-described aspect, for example, immediately after start-up of the internal combustion engine at which the temperature of the coolant is low, or the like, the temperature of the air for air conditioning can be raised at an even earlier stage by causing the coolant, that is stored in the tank of the cooling unit, to circulate between the exhaust heat recovery device and the heater core via the bypass circulation path.

Advantageous Effects of Invention

As described above, in accordance with the vehicle front portion structure relating to the present invention, a catalyst can be heated to the activation temperature or higher at an early stage while thermal deterioration of the catalyst is suppressed.

BEST MODES FOR CARRYING OUT THE INVENTION

A vehicle front portion structure relating to an embodiment of the present invention is described hereinafter with reference to the drawings. Note that arrow FR shown appropriately in the respective drawings indicates the front side in a vehicle longitudinal direction, arrow UP indicates the upper side in a vehicle vertical direction, and arrow OUT indicates the outer side (vehicle cabin outer side) in a vehicle transverse direction. Further, in the following description, there are cases in which the vehicle longitudinal direction is abbreviated simply as longitudinal, and the vehicle vertical direction is abbreviated simply as vertical.

Figure 1:
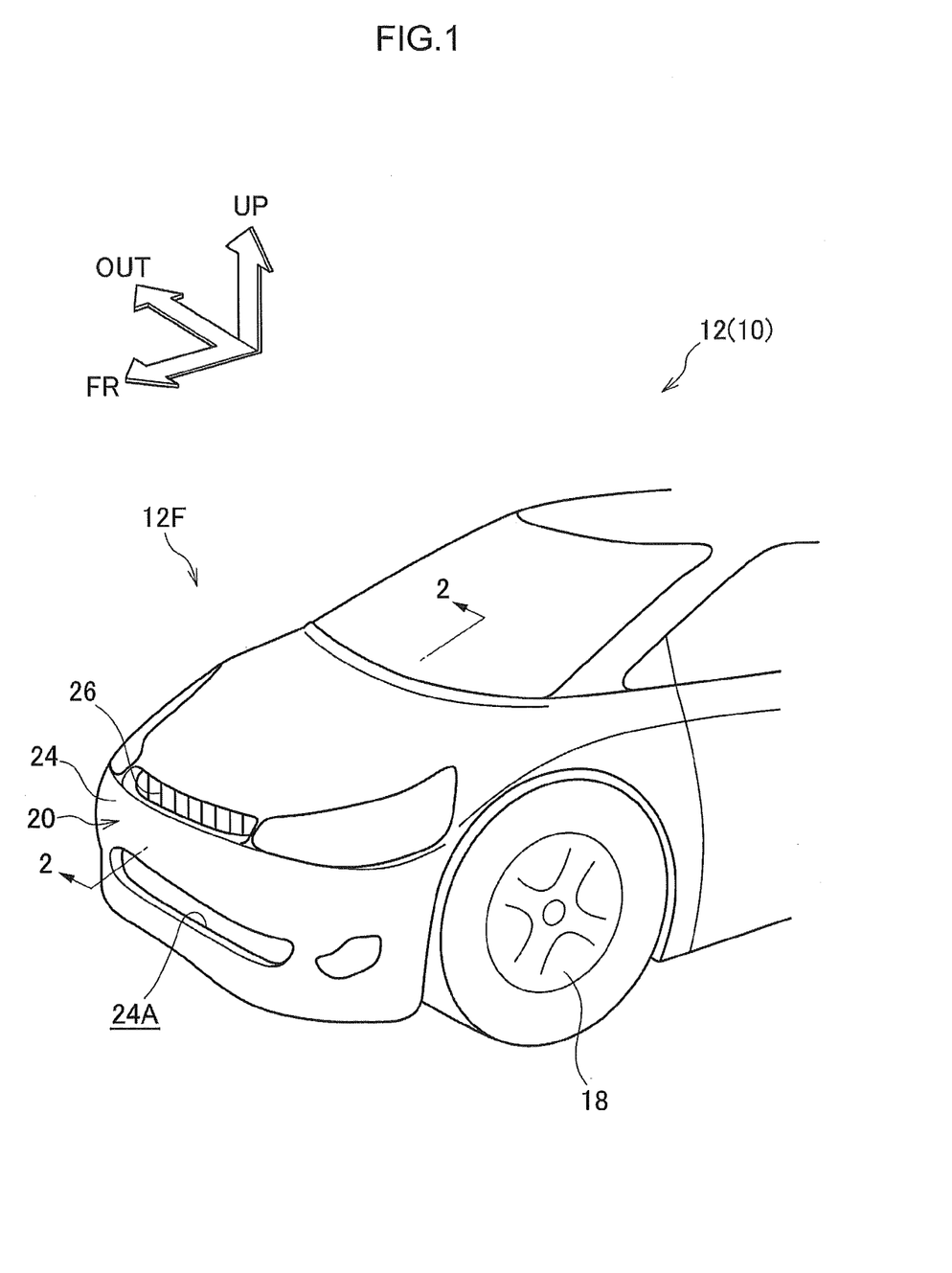
FIG. 1 is a perspective view showing a vehicle front portion of a vehicle to which a vehicle front portion structure relating to an embodiment of the present invention is applied.

First, the structure of a vehicle front portion 12F of a vehicle (automobile) 12, to which a vehicle front portion structure 10 relating to the present embodiment is applied, is described. The vehicle front portion 12F of the vehicle 12, to which the vehicle front portion structure 10 relating to the present embodiment is applied, is shown in a perspective view in FIG. 1, and an enlarged cross-sectional view along line 2-2 of FIG. 1 is shown in FIG. 2.

(Structure of Power Unit Compartment and Power Unit)

Figure 2:
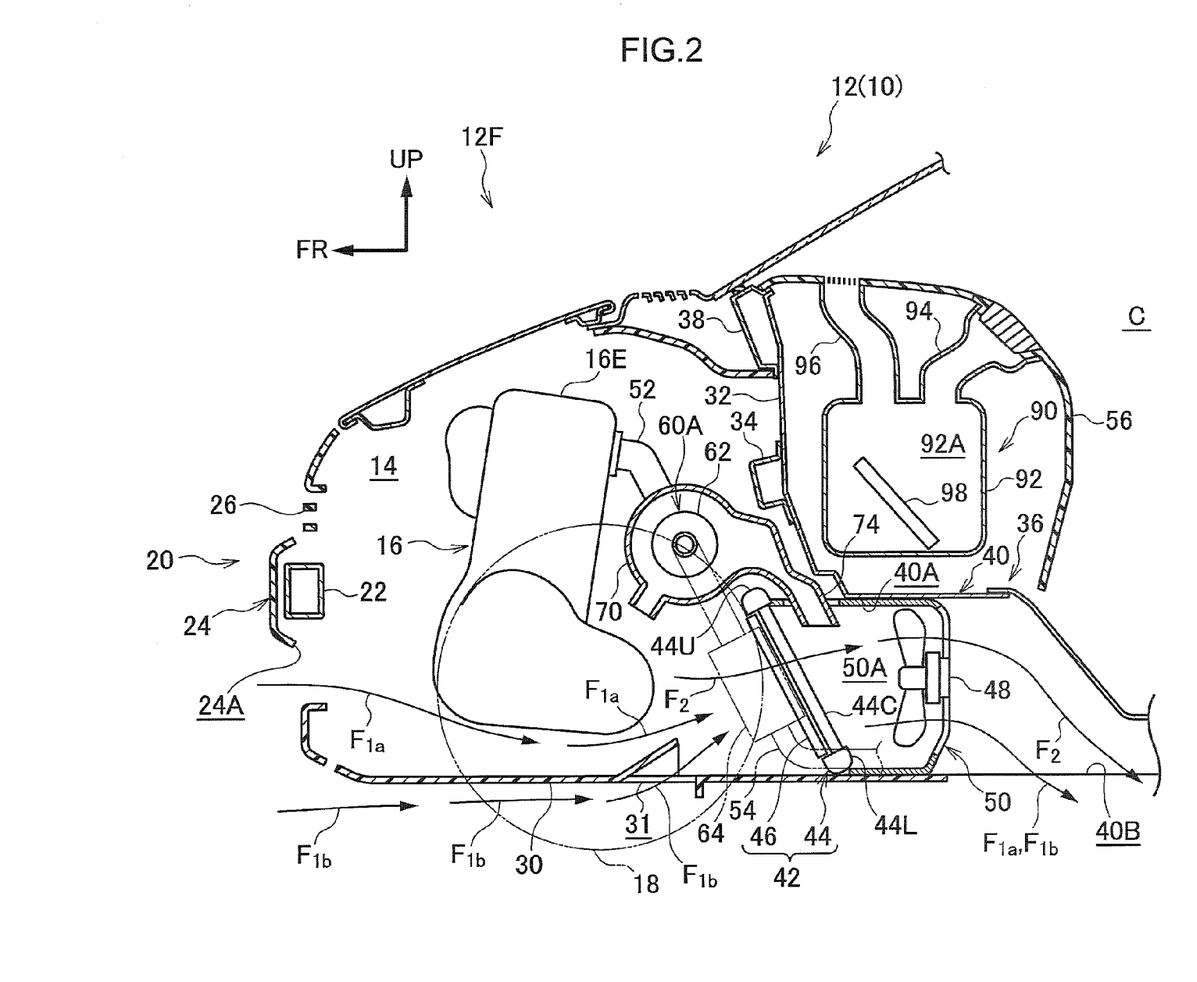
FIG. 2 is an enlarged cross-sectional view along line 2-2 of FIG. 1.

As shown in FIG. 2, a power unit compartment 14 is formed in the vehicle front portion 12F. A power unit 16 is disposed in this power unit compartment 14. The power unit 16 is structured to include an engine 16E, that serves as an internal combustion engine, and an electric motor that are drive sources for driving front wheels 18. Namely, the vehicle 12 is a hybrid automobile that has the engine 16E and the electric motor that generate the driving force that causes the vehicle 12 to travel.

Concretely, the power unit 16 is structured with the main portions thereof being the engine 16E, that is disposed laterally and has a crank shaft that runs along the vehicle transverse direction, and a transaxle that is connected to the engine 16E so as to be able to transmit power. The transaxle is structured to include an electric motor, and an unillustrated generator, power dividing mechanism, transmission that is a continuously variable transmission or the like, and the like. Further, in the present embodiment, the transaxle is structured to include, for example, an electric motor, a generator, and an inverter that is electrically connected to a battery. Namely, the power unit 16 in the present embodiment can also be interpreted as a power plant.

An exhaust pipe 54 is connected to the engine 16E of the power unit 16 via an exhaust manifold 52 and catalytic converters 60A, 60B (see FIG. 3) that are described later and serve as exhaust purifying devices. This exhaust pipe 54 passes through a floor tunnel 40 that is described later, and reaches the rear portion of the vehicle 12. Further, an exhaust heat recovery device 64 that is described later is provided at the exhaust pipe 54.

Note that, in the present embodiment, the power unit compartment 14 can also be interpreted as an engine compartment. Further, the engine 16E and the electric motor that serve as drive sources may be structured so as to drive at least one of the front wheels 18 or unillustrated rear wheels.

A front bumper reinforcement 22, a front bumper cover 24 and a grill 26 are disposed at the front end portion of the power unit compartment 14. The front bumper cover 24 structures a portion of a front bumper 20, and, as shown in FIG. 1, is disposed with the longitudinal direction thereof being the vehicle transverse direction. As shown in FIG. 2, an outside air intake port 24A, for taking external air into the power unit compartment 14, is formed in the front bumper cover 24. The outside air intake port 24A opens the front bumper cover 24 in the vehicle longitudinal direction, and, accompanying traveling of the vehicle 12, traveling wind (arrow $F_{1a}$) is taken into the power unit compartment 14 through the outside air intake port 24A. The traveling wind that is taken-into the power unit compartment 14 flows rearward along an under cover 30 that covers the power unit 16 from beneath, and cools a cooling unit 42 that is described later. Further, an air intake port 31, that opens facing the road surface, is formed in the under cover 30, and the cooling unit 42 is cooled also by the air (traveling wind, arrow $F_{1b}$) that is taken-in from this air intake port 31.

On the other hand, a dash panel 32, that divides the power unit compartment 14 and a vehicle cabin C, is disposed at the rear end portion of the power unit compartment 14. The dash panel 32 is supported at a dash cross member 34 that extends in the vehicle transverse direction, and the front end portion of a floor panel 36 is joined to the lower portion thereof. Further, a cowl 38 is joined to the upper portion of the dash panel 32. Note that the floor panel 36 is structured to include the region that extends rearward from the lower end portion of the dash panel 32.

The floor tunnel 40, that forms a substantial U-shape in cross-section whose lower side is open, is formed at the central portion in the vehicle transverse direction at the floor panel 36. The floor tunnel 40 extends rearward from the lower portion of the dash panel 32, and a flow-in port 40A that opens toward the front is formed at the front end portion thereof, and a discharge port 40B that opens downward is formed at the rear portion thereof. Note that illustration of the rear end portion of the floor tunnel 40 is omitted in FIG. 2.

(Structure of Cooling Unit and Cooling Fan)

The cooling unit 42 is disposed beneath the dash panel 32 at the power unit compartment 14. Namely, the cooling unit 42 is disposed at the rear side, in the vehicle longitudinal direction, with respect to the engine 16E of the power unit 16. The cooling unit 42 is disposed so as to cover the flow-in port 40A that is formed in the front end portion of the floor panel 40. This cooling unit 42 is structured to include a radiator 44 and a condenser 46.

The radiator 44 is a device that cools coolant (cooling water) that circulates between the radiator 44 and a water jacket that is provided within the engine 16E of the power unit 16, and has an upper tank 44U and a lower tank 44L that store coolant, and a radiator core 44C that connects this upper tank 44U and lower tank 44L. A first circulation path J1 (see FIG. 6) that is described later is connected to the upper tank 44U that serves as a reservoir, and coolant is made to flow in the upper tank 44U. Further, a bypass flow path BP (see FIG. 6) that is described later is connected to the upper tank 44U.

The radiator core 44C is an air-cooling-type heat exchanger that exchanges heat between air and the coolant, that is made to flow-in from the upper tank 44U, and cools the coolant. The coolant that is cooled at the radiator core 44C is returned, via the lower tank 44L and the first circulation path J1, to the water jacket within the engine 16E.

The condenser 46 is disposed in front of the radiator 44. Together with an evaporator, a compressor, an expansion valve, pipes that circulate an air conditioning refrigerant between these, and the like that are not illustrated and are described later, the condenser 46 structures a refrigeration cycle of an air conditioner 90. This condenser 46 is an air-cooling-type heat exchanger (condenser) that exchanges heat between the air conditioning refrigerant and air and cools this air conditioning refrigerant.

A cooling fan 48 that serves as a fan is disposed at the rear of the cooling unit 42. The cooling unit 42 and the cooling fan 48 are disposed with an interval therebetween in the longitudinal direction, and are made integral via a fan shroud 50 that serves as a shroud. A cooling wind flow path 50A that is covered by the fan shroud 50 is formed between this cooling unit 42 and the cooling fan 48.

The cooling fan 48 is an electric fan, and is disposed so as to, by being operated, generate cooling wind (air flow, arrow $F_2$) that passes through the cooling unit 42. Namely, when the cooling fan 48 is operated, cooling wind, that passes through the cooling unit 42 from the front toward the rear, is generated. This cooling wind passes through the cooling wind flow path 50A and is sent-out toward the rear of the cooling fan 48, and is discharged to the exterior of the vehicle from the discharge port 40B that is formed at the rear end side of the floor tunnel 40.

Note that an engine ECU is electrically connected to the cooling fan 48. When the temperature of the coolant that cools the engine 16E of the power unit 16 is greater than or equal to a predetermined value, this engine ECU causes the cooling fan 48 to operate, and cools the radiator core 44C of the cooling unit 42. When the temperature of this coolant is less than the predetermined value, the engine ECU stops operation of the cooling fan 48.

Further, the aforementioned traveling winds (arrows $F_{1a}$, $F_{1b}$) that are taken-in into the power unit compartment 14 from the outside air intake port 24A formed in the front bumper cover 24 and the air intake port 31 formed in the under cover 30 accompanying the traveling of the vehicle 12, pass through the cooling unit 42 and flow into the floor tunnel 40 from the flow-in port 40A, and pass through the cooling wind flow path 50A and the cooling fan 48, and are discharged to the exterior of the vehicle from the discharge port 40B that is formed in the rear end side of the floor tunnel 40. Namely, in the present embodiment, the cooling unit 42 is cooled not only by the traveling winds (arrows $F_{1a}$, $F_{1b}$) that are taken-in into the power unit compartment 14 accompanying the traveling of the vehicle 12, but also by the cooling wind (arrow $F_2$) that is due to the operation of the cooling fan 48.

(Structure of Catalytic Converters)

Figure 3:
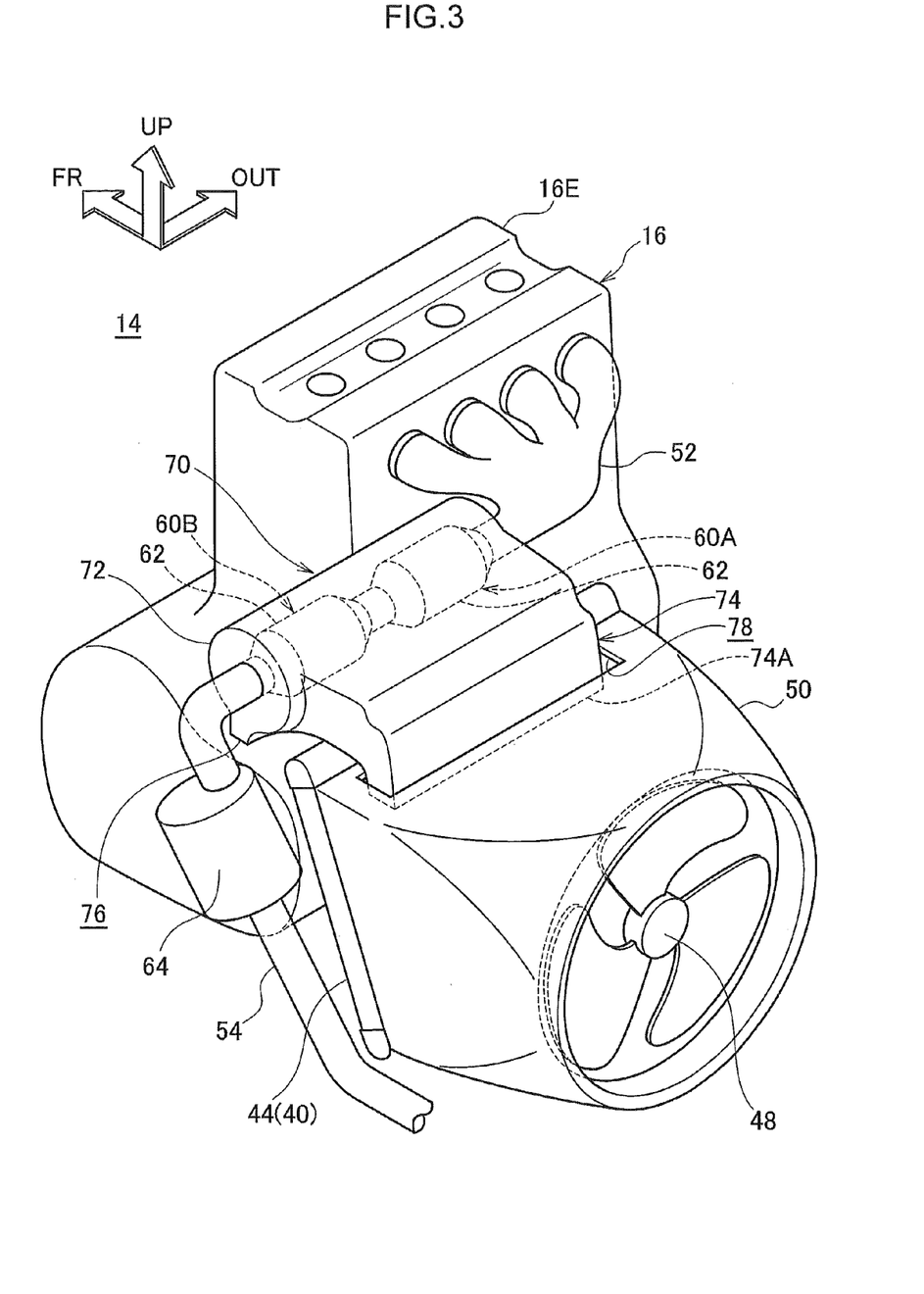
FIG. 3 is a perspective view showing a heat insulator shown in FIG. 1, and peripheral structures of the heat insulator.

As shown in FIG. 2 and FIG. 3, the two catalytic converters 60A, 60B are disposed in the power unit compartment 14. These catalytic converters 60A, 60B are purifying devices that purify exhaust gas that is discharged from the engine 16E of the power unit 16 via the exhaust manifold 52, and are disposed between the power unit 16 and the dash panel 32. Namely, the catalytic converters 60A, 60B are disposed at the front side in the vehicle longitudinal direction with respect to the dash panel 32. Note that illustration of the condenser 46 is omitted in FIG. 3.

As shown in FIG. 3, each of the catalytic converters 60A, 60B has a tubular case 62 that is formed in the shape of a tube, and is disposed with the longitudinal direction thereof being the vehicle transverse direction. These catalytic converters 60A, 60B are disposed so as to be lined-up in the vehicle transverse direction, and one end portions 62A in the longitudinal direction of the respective tubular cases 62 are connected to one another (see FIG. 4).

Figure 4:
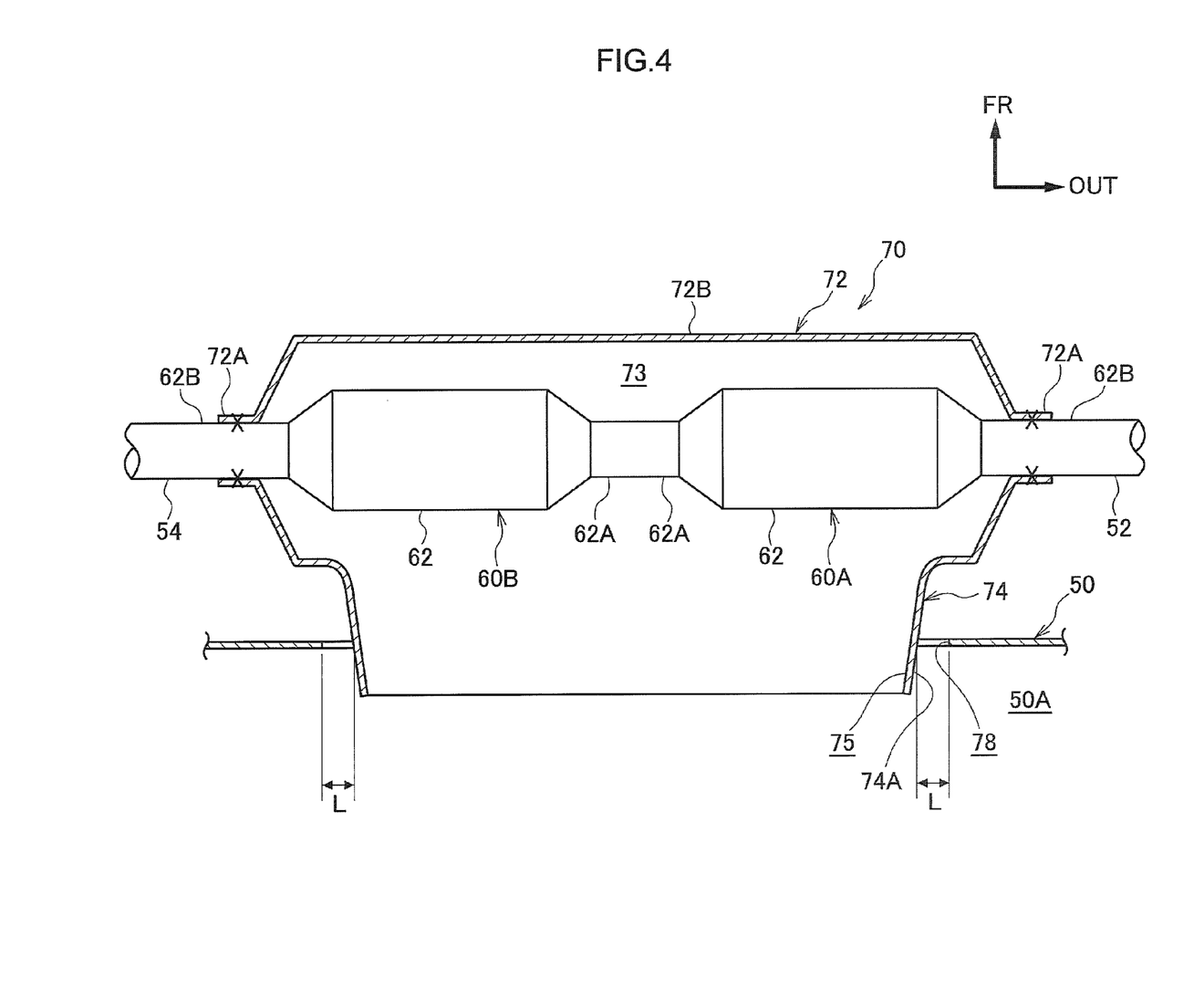
FIG. 4 is a cross-sectional view showing the heat insulator shown in FIG. 1.

As shown in FIG. 4, the exhaust manifold 52 is connected to another end portion 62B in the longitudinal direction of the tubular case 62 of the catalytic converter 60A that is disposed at the engine 16E side, and the exhaust gas that is discharged from the engine 16E is made to flow-in via the exhaust manifold 52 into this tubular case 62. On the other hand, the exhaust pipe 54 is connected to the other end portion 62B in the longitudinal direction of the tubular case 62 of the catalytic converter 60B, and the exhaust gas, that has passed through the catalytic converters 60A, 60B, is discharged via the exhaust pipe 54 and an unillustrated muffler from the vehicle rear portion to the exterior of the vehicle.

An unillustrated catalyst holder that holds the catalyst is accommodated within each of the tubular cases 62. The catalyst is structured to include a noble metal such as, for example, platinum, palladium, rhodium or the like, and has a purifying function (purifying action) of purifying the exhaust gas that has been made to flow into the tubular case 62.

(Structure of Heat Insulator)

As shown in FIG. 3 and FIG. 4, the respective catalytic converters 60A, 60B are surrounded (covered) by a heat insulator 70 that serves as a heat retaining member. The heat insulator 70 is formed of a metal having a heat retaining ability such as, for example, aluminum or the like. This heat insulator 70 has a main body portion 72 that surrounds the peripheries of the catalytic converters 60A, 60B, and a duct portion 74 that communicates the interior of the main body portion 72 and the cooling wind flow path 50A within the fan shroud 50.

As shown in FIG. 4, the main body portion 72 of the heat insulator 70 is formed in the shape of a tube, and an accommodating chamber 73 that accommodates the two catalytic converters 60A, 60B is formed therein. Mounting portions 72A, that are respectively joined by welding or the like to the other end portions 62B in the longitudinal direction of the catalytic converters 60A, 60B, are provided at the both end portions in the longitudinal direction of this main body portion 72. On the other hand, the diameter of an intermediate portion 72B in the longitudinal direction of the main body portion 72 is made to be larger than those of the mounting portions 72A, and the intermediate portion 72B surrounds the peripheries of these catalytic converters 60A, 60B at a position that is apart from the two catalytic converters 60A, 60B.

Further, the duct portion 74, that extends toward the above-described fan shroud 50 from the rear portion of the main body portion 72, is provided integrally with this rear portion. A discharge port 75 is formed at a distal end portion 74A of the duct portion 74. The distal end portion 74A of this duct portion 74 is inserted in a connection port 78 that is formed in the top wall portion of the fan shroud 50. The accommodating chamber 73 within the main body portion 72 and the cooling wind flow path 50A within the fan shroud 50 are communicated by this duct portion 74.

The connection port 78 that is formed at the fan shroud 50 is made to be larger than the distal end portion 74A of the duct portion 74, and a gap L is formed between the edge portion of the connection port 78 and the distal end portion 74A of the duct portion 74. The duct portion 74 can be displaced, in the vehicle transverse direction and the vehicle longitudinal direction, relative to the fan shroud 50 within the range permitted by this gap L. Namely, the heat insulator 70 is supported by the catalytic converters 60A, 60B so as to be able to be displaced, in the vehicle transverse direction and the vehicle longitudinal direction, relative to the fan shroud 50. Due thereto, when the heat insulator 70 vibrates integrally with the catalytic converters 60A, 60B due to vibrations that have propagated from the engine 16E or vibrations that accompany the traveling of the vehicle, the connection port 78 of the fan shroud 50 and the distal end portion 74A of the duct portion 74 are not damaged.

Further, due to the gap L that is formed between the edge portion of the connection port 78 and the distal end portion 74A of the duct portion 74, air of the power unit compartment 14 can flow into the cooling wind flow path 50A within the fan shroud 50. Namely, the gap L can be interpreted as an air intake port for taking air of the power unit compartment 14 into the fan shroud 50 interior.

Figure 5:
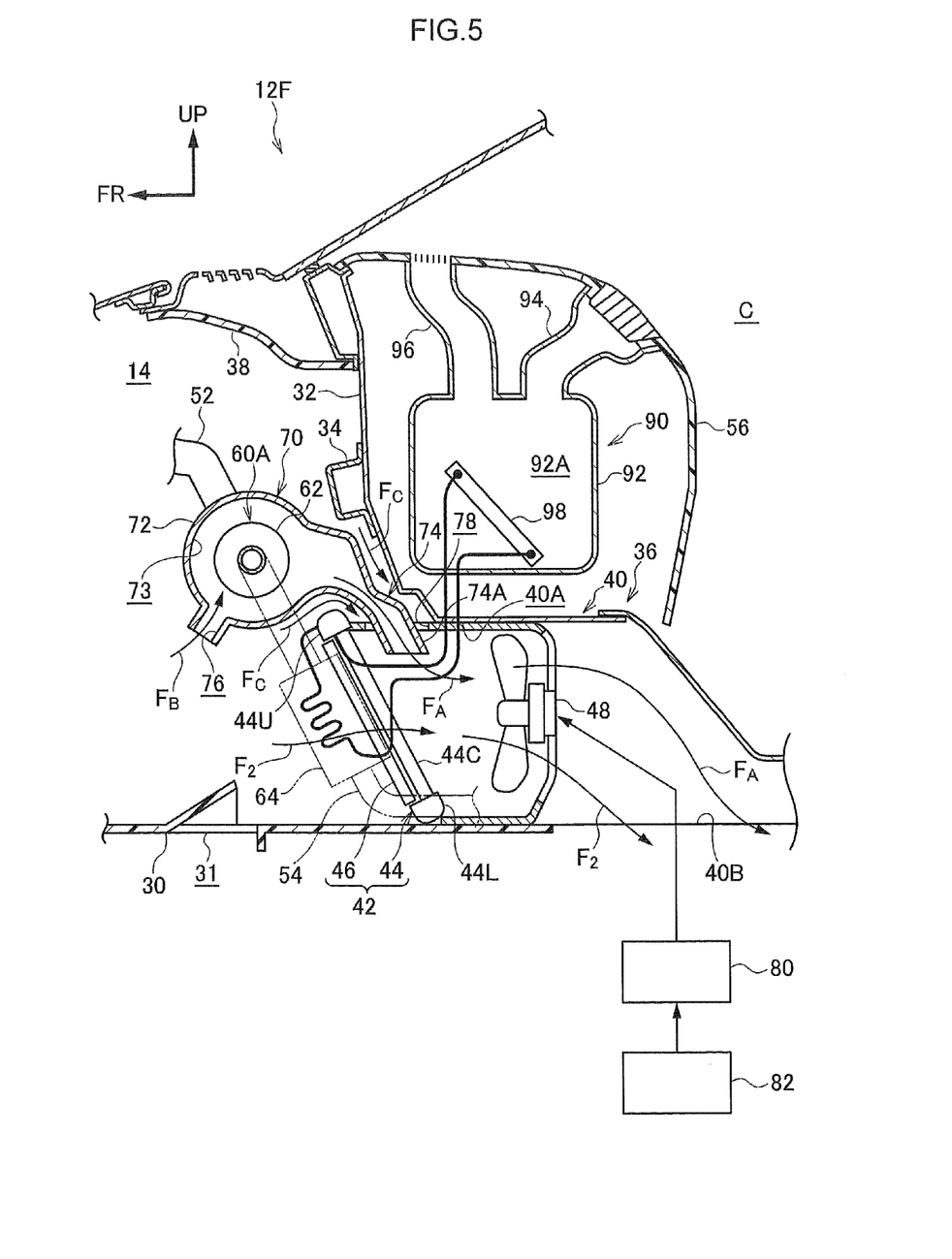
FIG. 5 is an enlarged cross-sectional view of FIG. 2.

On the other hand, as shown in FIG. 5, an air intake port 76, for taking air into the accommodating chamber 73 within the main body portion 72, is formed at the lower portion of the main body portion 72. This air intake port 76 opens downward and forward. Via this air intake port 76, air within the power unit compartment 14 can flow into the accommodating chamber 73 within the main body portion 72 of the heat insulator 70.

(Structure of Cooling ECU)

Here, a cooling ECU (Electronic Control Unit) 80 that serves as a control section is electrically connected to the above-described cooling fan 48. The cooling ECU 80 is structured to include a CPU, and a storage that is structured by a non-volatile memory or the like. Control programs executed by the CPU, and a thermal deterioration temperature $T_d$ of the catalyst within the catalytic converters 60A, 60B, are stored in advance in this storage. This thermal deterioration temperature $T_d$ is set to be higher than the activation temperature of the catalyst, and is set to a temperature of an extent such that, for example, the catalyst does not thermally deteriorate.

Further, a temperature sensor 82, that serves as a temperature detecting portion and detects the temperature of the catalyst within the catalytic converters 60A, 60B, is electrically connected to the cooling ECU 80, and temperature information (hereinafter called "detected temperature $T_c$") of the catalyst that is detected by the temperature sensor 82 is inputted to the cooling ECU 80. This cooling ECU 80 causes the cooling fan 48 to operate when the detected temperature $T_c$ of the catalyst inputted from the temperature sensor 82 is greater than or equal to the thermal deterioration temperature $T_d$ ($T_c \geq T_d$), and stops operation of the cooling fan 48 when the detected temperature $T_c$ is less than the thermal deterioration temperature $T_d$ ($T_c < T_d$).

(Structure of Exhaust Heat Recovery Device)

The exhaust heat recovery device 64 is provided at the exhaust pipe 54 that is connected to the catalytic converters 60A, 60B. The exhaust heat recovery device 64 is disposed at the rear side with respect to the engine 16E of the power unit 16 at the power unit compartment 14, and is disposed at the lower side and the front side with respect to the dash panel 32. Further, the catalytic converters 60A, 60B are disposed adjacent to the cooling unit 42. This exhaust heat recovery device 64 is a heat exchanger that exchanges heat between the exhaust gas that flows through the exhaust pipe 54 and the coolant that flows through a second circulation path J2 (FIG. 6) of a coolant circulation path 100 that is described later, and heats this coolant.

(Structure of Air Conditioner)

An instrument panel 56 is disposed at the rear of the dash panel 32. An air conditioning case 92 that structures the air conditioner (air conditioning unit) 90 is disposed between this dash panel 32 and instrument panel 56.

An unillustrated outside air duct, that is for taking air at the exterior of the vehicle into an air conditioning chamber 92A formed within the air conditioning case 92, is connected to the front end side of the air conditioning case 92. On the other hand, an unillustrated inside air duct, that is for taking air within the vehicle cabin C into the air conditioning chamber 92A, is connected to the rear end side of the air conditioning case 92. Further, outside/inside air switching dampers, that open and close the outside air duct and the inside air duct respectively and that make it possible to take air (outside air, inside air) into the air conditioning chamber 92A from at least one of the outside air duct or the inside air duct, are provided at the air conditioning case 92.

Further, register nozzles 94 and defroster nozzles 96, that are for blowing-out air for air conditioning of the air conditioning chamber 92A into the vehicle cabin C, are connected to the rear end side of the air conditioning case 92. Moreover, blow-out port switching dampers, that open and close the register nozzles 94 and the defroster nozzles 96 respectively and that make it possible to blow-out the air for air conditioning into the vehicle cabin C from at least one of the register nozzles 94 or the defroster nozzles 96, are provided at the air conditioning case 92.

An unillustrated evaporator and a heater core 98 are disposed in the air conditioning chamber 92A of the air conditioning case 92. The evaporator (evaporator) is a heat exchanger for cooling that, together with the above-described condenser 46, structures the cooling/freezing cycle of the air conditioner 90, and that, by exchanging heat between the air for air conditioning that flows through the air conditioning chamber 92A and the air conditioning refrigerant and taking the latent heat of vaporization from the air for air conditioning, cools this air for air conditioning. The heater core 98 is a heat exchanger for heating that exchanges heat between the air for air conditioning that flows through the air conditioning chamber 92A and the coolant that flows through the second circulation path J2 (FIG. 6) of the coolant circulation path 100 that is described later, and heats this air for air conditioning.

Further, an unillustrated air conditioning blower is disposed in the air conditioning chamber 92A of the air conditioning case 92. By being operated, this air conditioning blower draws-in outside air or the like from the above-described outside air duct or the like into the air conditioning chamber 92A, and sends the drawn-in outside air or the like out toward the heater core 98 or the evaporator. The temperature of the air for air conditioning, that is sent-out toward the heater core 98 or the evaporator by this air conditioning blower, is adjusted by heat exchange with this heater core 98 or evaporator, and thereafter, is blown-out as air-conditioned air into the vehicle cabin C from the above-described register nozzles 94 or the like.

(Structure of Coolant Circulation Path)

Figure 6:
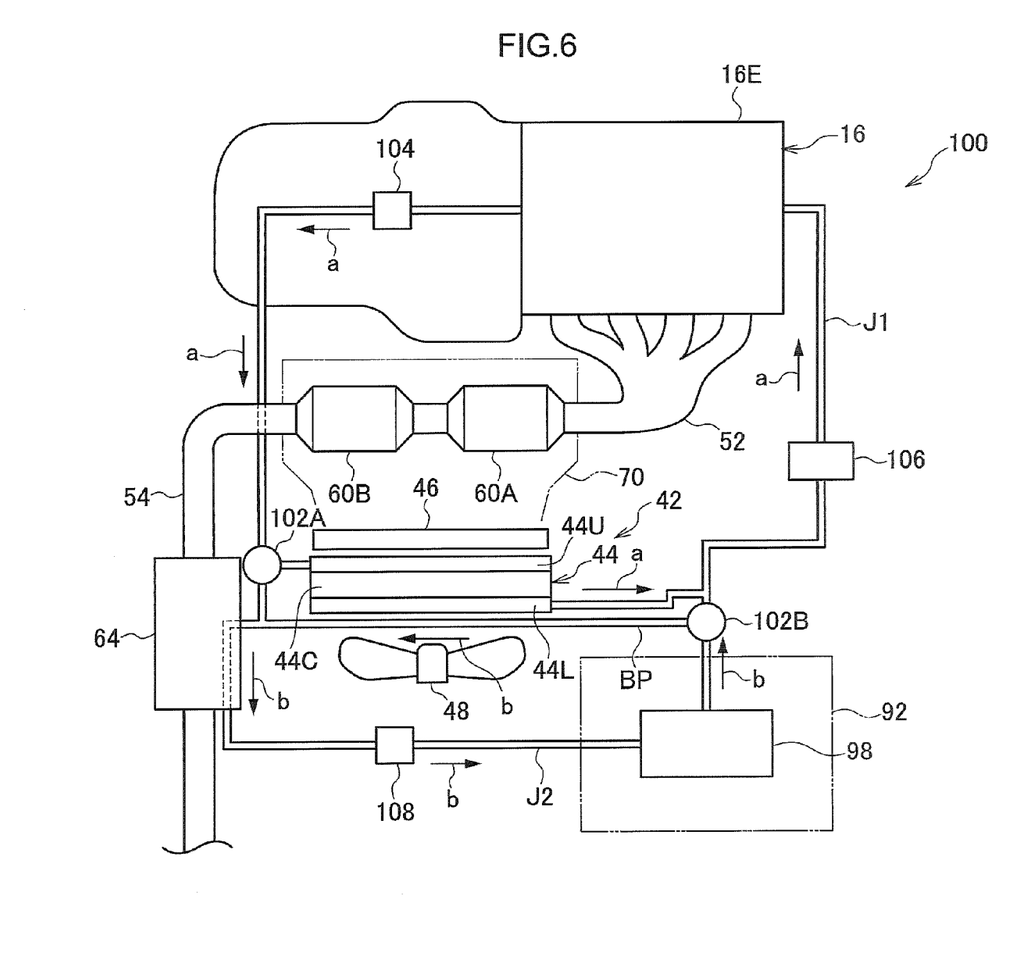
FIG. 6 is a schematic drawing showing a coolant circulation path through which coolant, that cools an engine of a power unit shown in FIG. 1, circulates.

The coolant circulation path 100, through which the coolant that cools the engine 16E of the power unit 16 circulates, is shown schematically in FIG. 6. The coolant circulation path 100 has the first circulation path J1 that circulates the coolant between the engine 16E and the radiator 44.

A mechanical pump 104, that sends the coolant under pressure in the arrow a direction, is provided at the downstream side of the engine 16E on the first circulation path J1. This mechanical pump 104 is structured so as to be driven by power of the engine 16E. Note that an electric pump may be used instead of the mechanical pump 104.

The above-described radiator 44 is provided at the downstream side of the mechanical pump 104 on the first circulation path J1. The first circulation path J1 is connected to the upper tank 44U of the radiator 44. The coolant, that has been made to flow into the upper tank 44U from this first circulation path J1, is cooled at the radiator core 44C, and thereafter, is made to flow out from the lower tank 44L to the first circulation path J1.

A thermostat 106 is provided at the downstream side of the radiator 44 on the first circulation path J1. The thermostat 106 is a device that adjusts the degree of opening of the first circulation path J1 in accordance with the temperature of the coolant, and increases or decreases the flow rate of the coolant that circulates between the engine 16E and the radiator 44. Concretely, as the temperature of the coolant becomes higher, the thermostat 106 increases the degree of opening of the first circulation path J1 such that the flow rate of the coolant circulating through the first circulation path J1 increases, and, as the temperature of the coolant becomes lower, the thermostat 106 decreases the degree of opening of the first circulation path J1 such that the flow rate of the coolant circulating through the first circulation path J1 decreases.

Further, the second circulation path J2, that bypasses the radiator 44 and circulates the coolant between the water jacket within the engine 16E and the heater core 98, is connected to the first circulation path J1. An electromagnetic first three-way valve 102A and second three-way valve 102B are respectively provided at the connected portions of this first circulation path J1 and second circulation path J2. Due to the first circulation path J1 and the second circulation path J2 being opened and closed by this first three-way valve 102A and second three-way valve 102B, the coolant is made to flow from the first circulation path J1 to the second circulation path J2.

The above-described exhaust heat recovery device 64 and heater core 98 are provided at the second circulation path J2. Further, the bypass flow path BP, that bypasses the water jacket within the engine 16E and the radiator 44, is provided at the second circulation path J2. Concretely, the bypass path BP forks-off from the second circulation path J2 at the second three-way valve 102B, and is connected between the first three-way valve 102A and the exhaust heat recovery device 64 at the second circulation path J2. A bypass circulation path, that bypasses the water jacket within the engine 16E and the radiator 44 and circulates coolant between the exhaust heat recovery device 64 and the heater core 98, is formed at the second circulation path J2 by this bypass flow path BP. Moreover, an electric pump 108, that sends coolant under pressure in the arrow b direction, is provided at the second circulation path J2.

Figure 7:
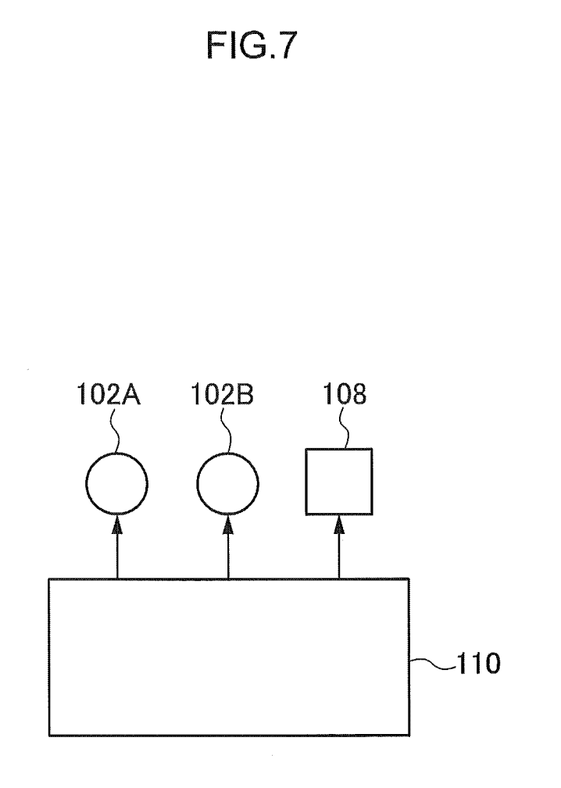
FIG. 7 is a block diagram showing an air conditioning ECU relating to the embodiment of the present invention.

Further, as shown in FIG. 7, an air conditioning ECU 110 is electrically connected to the first three-way valve 102A, the second three-way valve 102B and the electric pump 108. Further, the air conditioning blower and a heating switch, that is not illustrated and is provided at the instrument panel 56 (see FIG. 5), are connected to the air conditioning ECU 110. Operation of the air conditioning blower, the first three-way valve 102A, the second three-way valve 102B, the electric pump 108, and the like is controlled on the basis of a heating request signal that is inputted from this heating switch.

Note that the air conditioner 90 in the present embodiment is structured to include the cooling/freezing cycle that includes the above-described air conditioning case 92, air conditioning blower, heater core 98, evaporator and the like, and the second circulation path J2, the bypass flow path BP, and the like.

Operation of the vehicle front portion structure relating to the present embodiment is described next.

(Operation of Catalytic Converters and Heat Insulator)

As shown in FIG. 5, the periphery of the catalytic converters 60A, 60B is surrounded by the heat insulator 70. By surrounding the catalytic converters 60A, 60B by the heat insulator 70 in this way, it is easy for the catalyst within the catalytic converters 60A, 60B to warm-up due to the heat of the exhaust gas, as compared with a structure in which the periphery of the catalytic converters 60A, 60B is not surrounded by the heat insulator 70. Namely, the catalyst within the catalytic converters 60A, 60B can be heated to the activation temperature or higher at an early stage by the heat of the exhaust gas.

Accordingly, for example, immediately after start-up of the engine 16E of the power unit 16 at which the temperature of the exhaust gas is low, or the like, the catalyst within the catalytic converters 60A, 60B can be made to exhibit an exhaust gas purifying ability at an early stage. As a result, the amount of the precious metal, such as platinum or the like, that structures the catalyst can be reduced. Further, because it becomes possible to make the heat insulator 70 compact, a reduction in cost can be devised.

Further, in the present embodiment, the cooling unit 42 that includes the radiator 44 is disposed at the rear side with respect to the engine 16E of the power unit 16. Therefore, in the present embodiment, the power unit 16 can be disposed at the front end side at the power unit compartment 14, as compared with a case in which the cooling unit 42 is disposed at the front side with respect to the engine 16E of the power unit 16, i.e., a case in which the cooling unit 42 is disposed at the front end side of the vehicle 12. Due thereto, the catalytic converters 60A, 60B can be placed at the front side with respect to the dash panel 32 without enlarging the power unit compartment 14.

Further, by disposing the catalytic converters 60A, 60B at the front side with respect to the dash panel 32, the distance between the power unit 16 and the catalytic converters 60A, 60B is short and heat loss of the exhaust gas is reduced, as compared with a case in which the catalytic converters 60A, 60B are disposed at the rear side with respect to the dash panel 32. Moreover, by placing the catalytic converters 60A, 60B within the power unit compartment 14 in which the engine 16E of the power unit 16 serving as a heat source is disposed, the catalyst within the catalytic converters 60A, 60B warms-up more easily. Still further, the catalytic converters 60A, 60B are disposed with the longitudinal direction thereof being the vehicle transverse direction. Due thereto, the catalytic converters 60A, 60B can be set adjacent to the engine 16E of the power unit 16 over the entire longitudinal direction lengths thereof, as compared with a case in which the catalytic converters 60A, 60B are disposed with the longitudinal direction thereof being the vehicle longitudinal direction. Accordingly, the catalyst within the catalytic converters 60A, 60B can be heated to the activation temperature or higher at an even earlier stage.

On the other hand, if the temperature of the catalyst within the catalytic converters 60A, 60B rises too much, the catalyst thermally deteriorates, and there is the possibility that the exhaust purifying function of the catalyst will deteriorate. In particular, after the vehicle 12 has traveled on a long, sloping road, or the like, the power unit compartment 14 interior becomes high temperature, and there is a high possibility that the temperature of the catalyst within the catalytic converters 60A, 60B will reach the thermal deterioration temperature $T_d$.

In regard thereto, in the present embodiment, the air intake port 76 is formed at the heat insulator 70. Further, the duct portion 74 is provided at the heat insulator 70. The accommodating chamber 73 of the heat insulator 70 and the cooling wind flow path 50A within the fan shroud 50 are communicated by this duct portion 74. Further, when the temperature of the catalyst within the catalytic converters 60A, 60B reaches the thermal deterioration temperature $T_d$, the cooling fan 48 is operated by the cooling ECU 80. Due thereto, the accommodating chamber 73 of the heat insulator 70 is ventilated, and the catalytic converters 60A, 60B are cooled.

Concretely, the cooling ECU 80 causes the cooling fan 48 to operate when the detected temperature $T_c$ of the catalyst inputted from the temperature sensor 82 is greater than or equal to the thermal deterioration temperature $T_d$ ($T_c \geq T_d$). Due thereto, cooling wind (arrow $F_2$), that passes-through the cooling unit 42 and is discharged to the exterior of the vehicle, is generated, and negative pressure is generated at the duct portion 74 of the heat insulator 70. Due to this negative pressure, the air of the accommodating chamber 73 of the heat insulator 70 goes through the duct portion 74 and the cooling wind flow path 50A and is sent-out toward the rear of the cooling fan 48, and is discharged to the exterior of the vehicle (arrow $F_A$) from the discharge port 40B that is formed in the rear end side of the floor tunnel 40. Further, air within the power unit compartment 14 is taken-in (arrow $F_B$) into the accommodating chamber 73 of the heat insulator 70 from the air intake port 76. Namely, when the cooling fan 48 is operated, the accommodating chamber 73 of the heat insulator 70 is ventilated, and the catalytic converters 60A, 60B that are disposed in the accommodating chamber 73 of the heat insulator 70 are cooled. Due thereto, thermal deterioration of the catalyst within the catalytic converters 60A, 60B is suppressed.

Moreover, the gap L (see FIG. 4) is formed between the connection port 78 formed in the fan shroud 50 and the distal end portion 74A of the duct portion 74 of the heat insulator 70. Accordingly, when the cooling fan 48 is operated, air at the periphery of the heat insulator 70 is made to flow (arrow $F_C$) into the cooling wind flow path 50A from the above-described gap L, and is discharged to the exterior of the vehicle from the discharge port 40B formed in the rear end side of the floor tunnel 40. Namely, when the cooling fan 48 is operated, cooling wind (arrow $F_C$) is generated at the peripheral portion of the heat insulator 70. The heat insulator 70 is cooled from the outer side by this cooling wind.

Still further, when the cooling fan 48 is operated, air of the power unit compartment 14 is made to flow into the cooling wind flow path 50A from the flow-in port 40A that is formed in the front end portion of the floor tunnel 40, and is discharged to the exterior of the vehicle from the discharge port 40B that is formed in the rear end side of the floor tunnel 40. Due thereto, the temperature within the power unit compartment 14 falls, and therefore, the cooling efficiency of the catalytic converters 60A, 60B improves. Accordingly, thermal deterioration of the catalyst within the catalytic converters 60A, 60B is further suppressed. Further, due to the temperature of the power unit compartment 14 falling, thermal damage to other members within the power unit compartment 14 also is suppressed.

In this way, in accordance with the present embodiment, the catalyst within the catalytic converters 60A, 60B can be heated to the activation temperature or higher at an early stage, while thermal deterioration of the catalyst is suppressed.

Further, as described above, by forming the gap L between the connection port 78 formed in the fan shroud 50 and the distal end portion 74A of the duct portion 74 of the heat insulator 70, damage to the connection port 78 of the fan shroud 50 and the duct portion 74 of the heat insulator 70 is suppressed, even if the heat insulator 70 vibrates integrally with the catalytic converters 60A, 60B due to, for example, vibrations that have propagated from the power unit 16 or vibrations that accompany traveling of the vehicle 12.

Moreover, by making the heat insulator 70 and the catalytic converters 60A, 60B into a unit, the assemblability of the heat insulator 70 and the catalytic converters 60A, 60B with respect to the vehicle 12 improves.

Still further, the cooling unit 42 is structured to include the radiator 44. By ventilating the accommodating chamber 73 within the heat insulator 70 by using the cooling fan 48 that cools the radiator core 44C of this radiator 44, thermal deterioration of the catalyst within the catalytic converters 60A, 60B can be suppressed while the number of parts is reduced.

(Operation of Exhaust Heat Recovery Device and Air Conditioner)

Next, as shown in FIG. 6, in a case in which the temperature of the coolant that circulates through the first circulation path J1 of the coolant circulation path 100 is greater than or equal to a predetermined temperature, when the air conditioning ECU 110 (see FIG. 7) receives a heating request signal from the unillustrated heating switch, the air conditioning ECU 110 causes the first three-way valve 102A to operate and opens the flow path at the second circulation path J2 side, and causes the second three-way valve 102B to operate and opens the flow path at the first circulation path J1 side. Due thereto, the coolant that is sent under pressure by the mechanical pump 104 flows from the first circulation path J1 into the second circulation path J2. Namely, coolant of a predetermined temperature or higher bypasses the radiator 44 and is circulated between the heater core 98 and the water jacket within the engine 16E. Note that the flow path at the bypass flow path BP side of the second three-way valve 102B is in a closed state, and coolant does not flow from the second circulation path J2 into the bypass flow path BP.

In this state, the air conditioning ECU 110 further causes the air conditioning blower, that is disposed in the air conditioning chamber 92A of the air conditioning case 92, to operate. Due thereto, heat is exchanged between the air for air conditioning that passes by the heater core 98 and the coolant that flows within the heater core 98, and this air for air conditioning is heated. The heated air for air conditioning is blown-out into the vehicle cabin C from the register nozzles 94 or the like as air-conditioned air. Due thereto, the vehicle cabin C interior is heated. Thereafter, when the air conditioning ECU 110 receives a heating stop request from the heating switch, the air conditioning ECU 110 causes the first three-way valve 102A to operate and closes the flow path at the second circulation path J2 side, and causes the second three-way valve 102B to operate and closes the flow path at the first circulation path J1 side. Moreover, after stopping operation of the air conditioning blower, the air conditioning ECU 110 ends the control processing.

On the other hand, in a case in which the temperature of the coolant that circulates through the first circulation path J1 is less than the predetermined temperature, for example, immediately after start-up of the engine 16E of the power unit 16, or the like, when the air conditioning ECU 110 receives a heating request signal from the unillustrated heating switch, the air conditioning ECU 110 opens the flow path at the bypass flow path BP side. In this state, the air conditioning ECU 110 further causes the electric pump 108 to operate. Note that the flow path at the second circulation path J2 side of the first three-way valve 102A, and the flow path at the first circulation path J1 side of the second three-way valve 102B, are in closed states. Due thereto, the coolant, that is sent under pressure by the electric pump 108, is made to flow into the bypass flow path BP from the second circulation path J2, and circulates through the bypass circulation path. Namely, the coolant bypasses the water jacket within the engine 16E and the radiator core 44C of the radiator 44, and is circulated between the exhaust heat recovery device 64 and the heater core 98.

Then, after the coolant, that circulates through the bypass circulation path, is heated by heat exchange with the exhaust gas that flows through the exhaust pipe 54 at the exhaust heat recovery device 64, the coolant is supplied to the heater core 98. In this state, the air conditioning ECU 110 further causes the air conditioning blower, that is disposed in the air conditioning chamber 92A of the air conditioning case 92, to operate. Due thereto, the coolant flowing through the heater core 98 interior exchanges heat with the air for air conditioning that passes by the heater core 98, and this air for air conditioning is heated. The heated air for air conditioning is blown-out into the vehicle cabin C interior from the register nozzles 94 or the like as air-conditioned air. Due thereto, the vehicle cabin C interior is heated.

On the other hand, the coolant that circulates through the first circulation path J1 is heated by the heat of the engine 16E, and the temperature thereof gradually rises. Accompanying this rising of the temperature of the coolant that circulates through the first circulation path J1, the thermostat 106 increases the degree of opening of the first circulation path J1, and increases the flow rate of the coolant that flows through the first circulation path J1. Then, when the temperature of the coolant circulating through the first circulating path J1 becomes greater than or equal to a predetermined temperature, the air conditioning ECU 110 causes the first three-way valve 102A to operate, and opens the flow path at the second circulation path J2 side. Further, the air conditioning ECU 110 causes the second three-way valve 102B to operate and closes the flow path at the bypass flow path BP side, and opens the flow path at the first circulation path J1 side. Moreover, the air conditioning ECU 110 stops the electric pump 108. Due thereto, as described above, coolant of a predetermined temperature or higher, that is sent under pressure by the mechanical pump 104, is made to flow from the first circulation path J1 into the second circulation path J2. Namely, coolant of a predetermined temperature or higher is supplied to the heater core 98.

Thereafter, when a heating stop request is received from the heating switch, the air conditioning ECU 110 causes the first three-way valve 102A to operate and closes the flow path at the second circulation path J2 side, and causes the second three-way valve 102B to operate and closes the flow path at the first circulation path J1 side. Moreover, after stopping operation of the air conditioning blower, the air conditioning ECU 110 ends the control processing.

In this way, in the present embodiment, when the coolant that flows through the first circulation path J1 is less than a predetermined temperature, by causing the coolant to circulate at the short path (the bypass circulation path) between the exhaust heat recovery device 64 and the heater core 98, the temperature of the coolant can be raised at an early stage. As a result, the temperature of the vehicle cabin C interior can be raised at an early stage.

Further, as shown in FIG. 4, the exhaust heat recovery device 64, together with the catalytic converters 60A, 60B, is disposed at the front side with respect to the dash panel 32. Due thereto, in the present embodiment, the distance between the catalytic converters 60A, 60B and the exhaust heat recovery device 64 is short as compared with a case in which the exhaust heat recovery device 64 is disposed at the rear side with respect to the dash panel 32. Therefore, the length of the exhaust pipe 54 that connects these catalytic converters 60A, 60B and the exhaust heat recovery device 64 can be made to be short. Accordingly, heat loss of the exhaust gas that is supplied from the catalytic converters 60A, 60B to the exhaust heat recovery device 64 is reduced. Moreover, the exhaust heat recovery device 64 is disposed within the power unit compartment 14 in which the engine 16E of the power unit 16 that serves as a heat source is disposed. Accordingly, exhaust gas of a high temperature is supplied from the engine 16E of the power unit 16 to the exhaust heat recovery device 64.

Still further, as described above, the catalytic converters 60A, 60B are surrounded by the heat insulator 70 and are easy to warm-up. Accordingly, as compared with a case in which the catalytic converters 60A, 60B are not surrounded by the heat insulator 70, exhaust gas of an even higher temperature is supplied to the exhaust heat recovery device from the catalytic converters 60A, 60B. Accordingly, at the exhaust heat recovery device 64, the temperature of the coolant can be raised at an early stage.

Modified examples of the vehicle front portion structure relating to the above-described embodiment are described next.

As shown in FIG. 4, the above-described embodiment illustrates an example in which the mounting portions 72A of the main body portion 72 of the heat insulator 70 are mounted to the other end portions 62B of the respective catalytic converters 60A, 60B, but is not limited to this. For example, the mounting portions 72A of the main body portion 72 of the heat insulator 70 may be mounted by welding or the like to the exhaust manifold 52 and the exhaust pipe 54 that serve as pipes.

Figure 8:
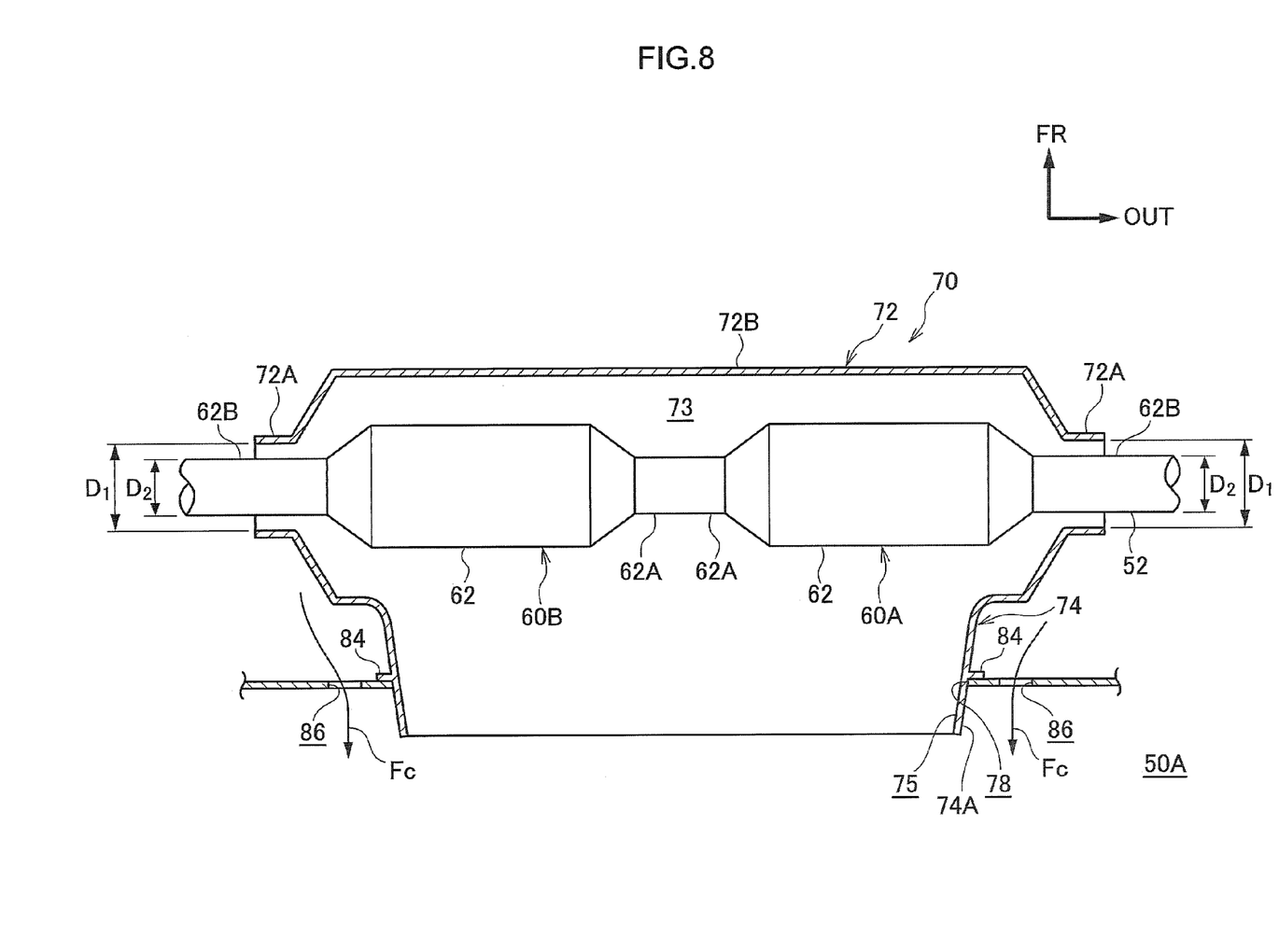
FIG. 8 is a cross-sectional view that corresponds to FIG. 5 and shows a heat insulator to which is applied a modified example of the vehicle front portion structure relating to the embodiment of the present invention.

Further, the above-described embodiment illustrates an example in which the heat insulator 70 is supported by the catalytic converters 60A, 60B so as to be able to be displaced relative to the fan shroud 50, but is not limited to this. For example, the heat insulator 70 may be supported by the fan shroud 50 so as to be able to be displaced relative to the catalytic converters 60A, 60B. Concretely, as shown in FIG. 8, projecting portions 84, that are engaged with the edge portion of the connection port 78 of the fan shroud 50, are provided at the distal end portion 74A of the duct portion 74 at the heat insulator 70. These projecting portions 84 and the edge portion of the connection port 78 are joined by welding or the like, and the heat insulator 70 is made integral with the fan shroud 50.

On the other hand, an inner diameter $D_1$ of the both end portions 72A in the longitudinal direction at the main body portion 72 of the heat insulator 70 are made to be greater than the outer diameter $D_2$ of the other end portions 62B in the longitudinal direction of the tubular cases 62 of the catalytic converters 60A, 60B. Due thereto, gaps are formed between the both end portions 72A of the main body portion 72 of the heat insulator 70 and the other end portions 62B of the respective tubular cases 62. The main body portion 72 of the heat insulator 70 can be displaced relative to the catalytic converters 60A, 60B within the range permitted by these gaps. Namely, the heat insulator 70 is supported at the fan shroud 50 so as to be able to be displaced relative to the catalytic converters 60A, 60B.

Due to the heat insulator 70 being supported by the fan shroud 50 so as to be able to be displaced relative to the catalytic converters 60A, 60B in this way, even if the heat insulator 70 vibrates integrally with fan shroud 50 due to vibrations that have propagated from the engine 16E or vibrations that accompany the traveling of the vehicle 12, damage to the connection port 78 of the fan shroud 50 and the distal end portion 74A of the duct portion 74 is suppressed.

Moreover, in the structure shown in FIG. 8, plural air intake ports 86, for taking air at the periphery of the heat insulator 70 into the cooling wind flow path 50A within the fan shroud 50, are formed at the outer periphery of the connection port 78 of the fan shroud 50. Due thereto, when the cooling fan 48 is operated, air at the periphery of the heat insulator 70 is made to flow-in (arrows $F_C$) into the cooling wind flow path 50A of the fan shroud 50 from the air intake ports 86, and is discharged to the exterior of the vehicle from the discharge port 40B formed in the rear end side of the floor tunnel 40. Accordingly, effects that are similar to the above-described embodiment can be obtained. Note that the air intake ports 86 can be omitted appropriately.

Further, although the above-described embodiment illustrates an example in which the exhaust heat recovery device 64 is provided at the second circulation path J2 of the coolant circulation path 100, it is not limited to this. For example, the exhaust heat recovery device 64 may be provided at the first circulation path J1 of the coolant circulation path 100, and, immediately after start-up of the engine 16E of the power unit 16, or the like, in a case in which the temperature of the coolant circulating through the first circulation path J1 is less than a predetermined temperature, heat may be exchanged between the exhaust gas discharged from the engine 16E and the coolant flowing through the first circulation path J1, and this coolant may be heated. Due thereto, the engine 16E can be warmed-up at an early stage. In particular, in a hybrid vehicle such as that of the above-described embodiment, the operation time of the engine 16E for warming-up is shortened, and therefore, an improvement in the fuel economy, and the like, can be devised.

Further, the above-described embodiment illustrates an example in which the two catalytic converters 60A, 60B that serve as exhaust purifying devices are disposed with the longitudinal directions thereof being the vehicle transverse direction, but is not limited to this. The number of and the orientation of the catalytic converters 60A, 60B can be changed appropriately. Moreover, although the above-described embodiment illustrates an example in which the catalytic converters 60A, 60B and the exhaust heat recovery device 64 are disposed at the front side in the vehicle longitudinal direction with respect to the dash panel 32, it is not limited to this. For example, the catalytic converters 60A, 60B and the exhaust heat recovery device 64 may be disposed at the rear side in the vehicle longitudinal direction with respect to the dash panel 32, or the exhaust heat recovery device 64 only may be disposed at the rear side in the vehicle longitudinal direction with respect to the dash panel 32.

Moreover, although the above-described embodiment illustrates an example in which the duct portion 74 that serves as a communication portion is provide integrally with the heat insulator 70 that serves as a heat retaining member, it is not limited to this. The heat retaining member and the communication portion can also be structured as separate bodies. In this case, for example, a connection port may be provided at the heat retaining member, and an end portion of the communication portion that is supported at the fan shroud 50 may be inserted into this connection port, and the interior of the heat retaining member and the space between the cooling unit 42 and the cooling fan 48 may be communicated.

Further, the above-described embodiment illustrates an example in which the bypass flow path BP is connected to the second circulation path J2 so as to bypass the radiator 44, but is not limited to this. For example, the bypass flow path BP may be connected to the upper tank 44U of the radiator 44 that serves as a tank, and the coolant may be circulated between the upper tank 44U, the exhaust heat recovery device 64, and the heater core 98. Further, for example, the lower tank 44L of the radiator 44, a reserve tank of the radiator 44, or the like can be used as the tank.

Moreover, although the above-described embodiment illustrates an example in which the cooling unit 42 and the cooling fan 48 are made integral by the fan shroud 50, it is not limited to this. For example, the cooling unit 42 and the cooling fan 48 may be structured as separate bodies. Further, it suffices for the cooling unit 42 to be structured so as to include at least one of the radiator 44 or the condenser 46.

Further, the above-described embodiment illustrates an example in which the power unit 16 includes the engine 16E, that serves as an internal combustion engine, and the electric motor, but the electric motor can be omitted appropriately. Namely, it suffices for the power unit 16 to be structured to include at least the engine 16E that serves as an internal combustion engine.

Further, all of the documents, patent applications, and technical standards mentioned in the present Description are incorporated by reference into the present Description to the same extent as a case in which the incorporation by reference of the individual documents, patent applications, and technical standards is described concretely and individually.

Although an embodiment of the present invention has been described above, the present invention is not limited to this embodiment, and the embodiment and various types of modified examples may be used by being combined appropriately, and the present invention can, of course, be implemented in various forms within a scope that does not deviate from the gist of the present invention.

The invention claimed is:

1. A vehicle front portion structure comprising:
   a power unit that is disposed in a power unit compartment provided at a vehicle front portion, and that includes an internal combustion engine that generates driving force that causes a vehicle to travel;
   a cooling unit that is disposed at a rear side in a vehicle longitudinal direction with respect to the power unit, and that is cooled by heat exchange with air;
   a fan that is disposed at a rear in the vehicle longitudinal direction of the cooling unit, and that, by being operated, generates cooling wind that passes through the cooling unit and is discharged to a vehicle exterior;
   an exhaust purifying device that is disposed at a rear side in the vehicle longitudinal direction with respect to the power unit, and that has a catalyst that purifies exhaust gas discharged from the internal combustion engine;
   a heat retaining member that surrounds a periphery of the exhaust purifying device, and in which is formed an air intake port that takes-in, into an interior, air that cools the exhaust purifying device; and
   a communication portion that communicates the interior of the heat retaining member and a space between the cooling unit and the fan.

2. The vehicle front portion structure of claim 1, wherein the exhaust purifying device is disposed at a front side in the vehicle longitudinal direction with respect to a dash panel that divides the power unit compartment and a vehicle cabin.

3. The vehicle front portion structure of claim 2, wherein the exhaust purifying device is disposed with a longitudinal direction thereof being in a vehicle transverse direction.

4. The vehicle front portion structure of claim 2, comprising:
   a temperature detecting portion that detects a temperature of the catalyst; and
   a control section that causes the fan to operate when the temperature of the catalyst detected by the temperature detecting portion is greater than or equal to a predetermined value.

5. The vehicle front portion structure of claim 1, comprising:
   a shroud that covers the space between the cooling unit and the fan, and in which a connection port, into which the communication portion is inserted, is formed,
   wherein the communication portion is provided at the heat retaining member, and
   the heat retaining member is supported at the exhaust purifying device or a pipe that is connected to the exhaust purifying device, so as to be able to be displaced relative to the shroud.

6. The vehicle front portion structure of claim 2, comprising:
   a shroud that covers the space between the cooling unit and the fan, and in which a connection port, into which the communication portion is inserted, is formed,
   wherein the communication portion is provided at the heat retaining member, and
   the heat retaining member is supported at the shroud, so as to be able to be displaced relative to the exhaust purifying device.

7. The vehicle front portion structure of claim 2, wherein the cooling unit is structured to include a radiator core that exchanges heat between air and coolant, that circulates between the radiator core and the internal combustion engine, and cools the coolant.

8. The vehicle front portion structure of claim 7, comprising:
   a heater core that exchanges heat between the coolant and air for air conditioning, and heats the air for air conditioning; and
   an exhaust heat recovery device that exchanges heat between the coolant, that bypasses the internal combustion engine and the radiator core and circulates between the exhaust heat recovery device and the heater core, and exhaust gas, that is discharged from the exhaust purifying device, and heats the coolant.

9. The vehicle front portion structure of claim 8, wherein the exhaust heat recovery device is disposed at a front side in the vehicle longitudinal direction with respect to the dash panel.

10. The vehicle front portion structure of claim 8, wherein
    the cooling unit is structured to include a tank that stores the coolant, and
    the vehicle front portion structure comprises a bypass circulation path that circulates the coolant between the tank, the exhaust heat recovery device, and the heater core.

* * * * *